April 28, 1931.   J. J. WACK   1,803,083

PROCESS AND APPARATUS FOR THE CLARIFICATION OF BENZINE

Filed Dec. 21, 1928   2 Sheets-Sheet 1

INVENTOR
Jean Jacques Wack
by
ATTORNEY

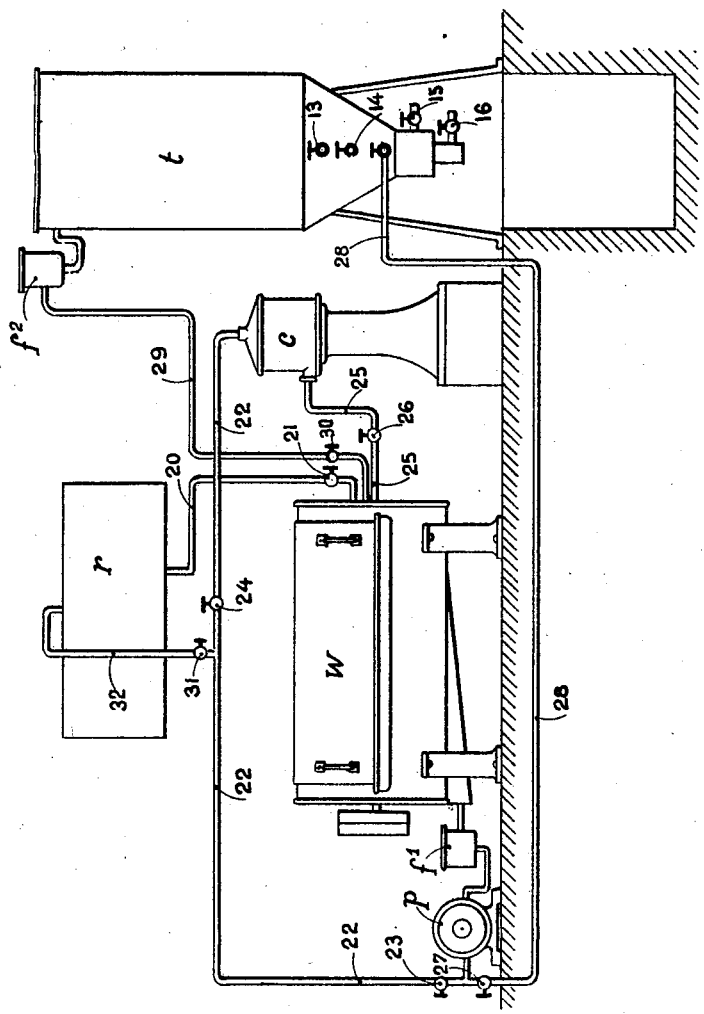

Patented Apr. 28, 1931

1,803,083

UNITED STATES PATENT OFFICE

JEAN-JACQUES WACK, OF COLMAR, FRANCE

PROCESS AND APPARATUS FOR THE CLARIFICATION OF BENZINE

Application filed December 21, 1928, Serial No. 327,528, and in France January 5, 1928.

This invention relates to a process and to apparatus for clarifying benzine, more particularly benzine which had been used for cleaning garments or clothes and other articles, in special washing machines, called benzine washers.

The object of the invention is on the one hand, to obtain a practically perfect clarification of the benzine, and on the other hand to provide a quick and economical process of clarification enabling the stock of benzine required for the working of a cleaning plant as well as the volume of the chemical agent employed to be reduced to a minimum. The invention comprises at the same time a clarifier specially designed for attaining these objects.

The process according to the invention constitutes an improvement on the well known process consisting in treating benzine with an alkaline solution for the purpose of precipitating by saponification the oils and fats contained in it in the state of emulsions.

In the well known processes, the benzine is introduced in a full jet into the alkaline solution and mixed with it by means of a mechanical device such as a mixer or stirrer. These mixers in spite of their energetic action, are incapable of dividing the benzine into very fine drops. The benzine spreads therefore in the alkaline solution in relatively large drops in which the fat emulsions are in equilibrium. As the specific gravity of benzine is lower than that of the alkaline solution, these large drops have a great buoyancy in the solution. The result is that in spite of the energic agitation produced by the mixers, they have the tendency of rising quickly to the surface of the liquid, and arrive therefore at the surface before the saponification of the fat emulsion contained in them is completely finished.

Moreover, as the benzine drops cause boiling at the surface of the alkaline solution, it is necessary to interpose between the tank with the mixers and the settling or decanting tank in which there must be absolute calmness, a special calming or steadying device.

The present invention remedies the drawbacks in question. The process of clarification according to the invention is chiefly characterized by the fact that after having been freed in the usual manner by centrifuging from the solid impurities carried away from the washing machine, the benzine is injected into the alkaline solution ($Na_2CO_3$) in a finely atomized state, and that this solution with which is incorporated a certain percentage of a neutral substance such as common salt (NaCl) as well as a commercial bleaching powder with an alkaline reaction, is covered with a layer of a substance of great viscosity, for instance with animal or vegetable glue.

The injection of the benzine in a finely atomized state into the alkaline solution has for its effect to reduce the speed of rising of the extremely fine drops which thus remain for a longer time in contact with the alkaline solution; the saponification of the emulsion takes place therefore in a more complete manner, namely the more so, the finer are the drops.

The incorporation with the alkaline solution ($Na_2CO_3$) of a neutral substance such as common salt (NaCl) as dissociation agent, results in accelerating the precipitation of the emulsions.

The layer of viscous substance (glue) covering the alkaline solution acts as a filter and keeps back any non-saponifiable dust that may have been carried away, and allows the benzine to pass only slowly. Consequently, there can be no boiling on the surface and the presence of the calming device above referred to, becomes unnecessary.

The addition of a commercial bleaching agent having an alkaline reaction has the advantage that it does not injure textile fibres during the subsequent re-utilization of the clarified benzine, as would have been the case if a bleaching agent with an acid reaction were used.

In the accompanying drawings:

Figure 4 shows diagrammatically a general arrangement of a cleaning plant using the clarifier of Figures 1 and 2.

Figure 1:
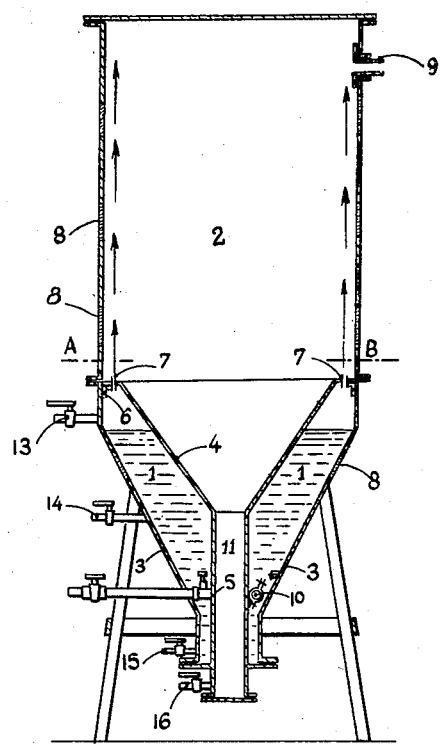
Figure 1 shows diagrammatically in vertical section a construction of a clarifier for carrying the process into practical effect.

The clarifier comprises in principle two chambers: a lower or clarification chamber 1, and an upper or decanting chamber 2. The clarifying chamber 1 is made in the shape of a funnel with a double wall 3—4. The inner wall or funnel 4 forms at the same time the bottom of the decanting chamber 2 and is extended downwards by a pipe 5 which opens outside the apparatus. The funnel 4 is supported on small angle irons 6 and provided with hooks or loops enabling it to be withdrawn for cleaning. The two chambers 1 and 2 communicate with each other by means of a ring of small holes 7 provided close to the cylindrical wall of the chamber 2. Openings or sights 8 are provided at intervals in the various walls of the apparatus so as to enable the operations to be followed. A pipe 9 for the discharge of the clarified benzine is arranged at the top of the chamber 2.

Figures 2, 3:
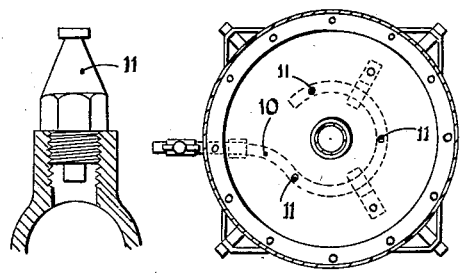
Figure 2 is a horizontal section on line A—B of Fig. 1.
Figure 3 shows a construction of the atomizer used.

In the interior of the saponification chamber 1 is a pipe 10, preferably of circular shape and closed at its end, for the introduction of the benzine. This pipe, which is arranged as low as possible in the chamber 1, carries a certain number of liquid atomizers 11 (Fig. 3) of any desired known construction, by means of which the benzine is injected under pressure in a finely atomized state into the clarifier. Cocks or valves 13, 14, 15, 16 are provided on the various parts of the apparatus.

For the working, the alkaline solution is pumped into the chamber 1 to a level just below that of the cock 13. This alkaline solution ($Na_2CO_3$) is mixed with a small proportion of common salt (NaCl) and with about 4% of a commercial bleaching powder having an alkaline reaction, said bleaching powder being formed e. g. of equal parts of calcium hydrochloride $Ca(ClO)_2$ and potassium carbonate ($K_2CO_3$).

Over the alkaline solution, through the cock 13 is pumped a substance of great viscosity, for instance animal or vegetable glue which, owing to its lower specific gravity, floats on the alkaline solution.

The benzine to be clarified, previously freed in a well known centrifugal apparatus from the chief impurities, namely from solid particles which it may have carried out from the washing machine, is then injected through the atomizers 11 into the alkaline solution. This injection under pressure has for its result the production in the chamber 1 of an energetic eddying or whirling, with a very thorough mixing of the benzine with the alkaline solution. As the benzine reaches the alkaline solution in a finely atomized state, the fat emulsions which it contains are immediately seized by the solution and saponified to fine flakes of insoluble soap which rise to the top and collect under the layer of glue where they are stopped. These flakes are lighter than the alkaline solution which has been rendered heavier by the addition of common salt.

The benzine freed from the fat emulsions, rises in the alkaline solution owing to the difference in specific gravity and as the benzine drops are extremely fine, they have only a small buoyancy and rise very slowly, so that there is ample time for the saponification to be completely finished before these drops reach the surface of the alkaline solution.

The object of the funnel shape of the chamber 1, the cross section of which increases in the upward direction, is to reduce the speed of ascension of the benzine drops in the alkaline solution. These drops filter then through the layer of glue, and this glue keeps back non-saponifiable dust which had been carried away.

The benzine passes then through the ring of small holes 7 into the decanting chamber 2 by going along the cylindrical wall of the latter; in spite of the strong eddying produced in the chamber 1, there will be the greatest possible quiet or calm in the chamber 2, owing to which the last impurities carried away will be able to settle down and to descend through the funnel 4 and to collect finally at the bottom of the pipe 5 whence they can be discharged through the cock 16.

The cock 13 is intended for the discharge of the greasy matters which collect under the layer of glue above the alkaline solution. The benzine completely clarified escapes from the clarifier through the pipe 9.

It must be pointed out that the decanting chamber 2 need not be necessarily arranged on the top of the saponification chamber 1 as shown in the drawing, but could also be arranged laterally, with or without the interposition of a final filter.

The diagram of Fig. 4 shows general arrangement of a complete plant and shows how goods can be cleaned and the benzine continuously clarified with this clarifier.

In the said diagram, $w$ is the benzine washing machine, $t$ the clarifier described, $c$ a known centrifugal clarifier, $r$ a rinsing benzine tank, $f^1$ and $f^2$ two filters and $p$ a circulating pump.

The procedure is as follows: The clothes to be cleaned are introduced into the machine $w$ which does not yet contain any benzine, then by opening the cock 21, rinsing benzine from the preceding operation is admitted by gravity from the tank $r$ through the pipe 20. The machine is then started. After the expiration of a certain time, when it is considered that the impregnation of the clothes and their washing are sufficient, the benzine is first clarified causing it to circulate by means of the pump in a circuit passing through the centrifugal clarifier $c$ in order to eliminate any solid impurities.

The circuit is as follows: machine $w$, filter $f^1$, pump $p$, pipe 22 (with the cocks 23 and 24 open), centrifugal machine $c$, pipe 25, cock 26 (open) machine $w$. After the elimination of coarse impurities, circulation through the centrifugal machine $c$ is stopped, and after having closed the cocks 23 and 24, the benzine is caused to circulate in the following circuit through the clarifier $t$: machine $w$, filter $f^1$, pump $p$, cock 27 (open) pipe 28, clarifier $t$, filter $f^2$, pipe 29 (cock 30 open), machine $w$. This circuit is maintained until the objects contained in the machine are completely rinsed. The cock 27 is thereupon closed and the cocks 23 and 31 are opened, and the rinsing benzine which is not quite pure is pumped into the tank $r$ through the filter $f^1$, the pump $p$, pipes 22 and 32. The machine $w$ can then be emptied. It must be pointed out that the washing operation is started with the rinsing benzine which is not entirely pure, but deprived of fats; the important factor is to do the rinsing with perfectly clarified benzine coming from the clarifier $t$.

The clothes come out then from the machine perfectly cleaned and free from any dark stains on the lining, which frequently happens with the present methods of working.

It is apparent that the particular installation or plant shown is not absolutely essential, and that the arrangement of the various parts would be varied according to local conditions of each particular case.

I am aware that it has already been proposed to use atomizers in other arts for the purpose of introducing reagents into liquids to be chemically treated, for instance in the desulphurization of oils, and in the treatment of hydrocarbon oils and tars, but as far as I know, the atomizing method has not been used in the treatment of benzine to separate oils and greases therefrom.

What I claim is:

1. A process for the clarification of benzine by the saponification of the oils and fats contained therein in the state of emulsions, by means of an alkaline solution, which process consists in that the benzine, freed in the usual manner from solid impurities by centrifuging, is injected in a finely atomized state into an alkaline solution mixed with common salt (NaCl) said alkaline solution being covered with glue, acting as a filter and preventing any frothing of the benzine at the surface of the alkaline solution.

2. A process for the clarification of benzine by the saponification of the oils and fats contained therein in the state of emulsions, by means of an alkaline solution, which process consists in that the benzine is freed from solid impurities by centrifuging, then injected in a finely atomized state into the alkaline solution mixed with common salt (NaCl) and a mixture of calcium hydrochlorite and potassium carbonate acting as a bleaching agent, said alkaline solution being covered with glue acting as a filter and preventing frothing of the benzine at the surface of the alkaline solution.

3. A benzine clarifier, comprising a funnel shaped double walled saponification chamber having an annular cross section increasing in the upward direction, a plurality of benzine atomizers arranged in a horizontal plane in the lower portion of said chamber, a decanting chamber above and adjacent to the saponification chamber, and small orifices arranged in a circle close to the walls of the decanting chamber to provide communication between the chambers and to allow a flow of benzine in an upward direction.

4. A benzine clarifier, comprising a funnel shaped double walled saponification chamber having an annular cross section increasing in the upward direction, a plurality of benzine atomizers arranged in a horizontal plane in the lower portion of said chamber, a cylindrical extension running downwards from the lower part of the saponification chamber, a cock at the lower part of said extension, an overflow pipe at the upper part of the chamber, a decanting chamber above and adjacent to the saponification chamber, small orifices arranged in a circle along the wall of the decanting chamber to provide communication between the two chambers and allow a flow of benzine in an upward direction, one wall of said double walled saponification chamber forming a cone-shaped bottom in the decanting chamber, a cylindrical extension of said bottom, extending downwards and ending outside the saponification chamber, a cock at bottom of the cylindrical extension, sight holes in the cylindrical wall of the decanting chamber, and an overflow pipe at the upper part of said chamber.

JEAN-JACQUES WACK.